Nov. 2, 1943.    D. W. CALLANDER    2,333,519
TRANSFORMER MOUNTING LUG
Filed Feb. 12, 1942
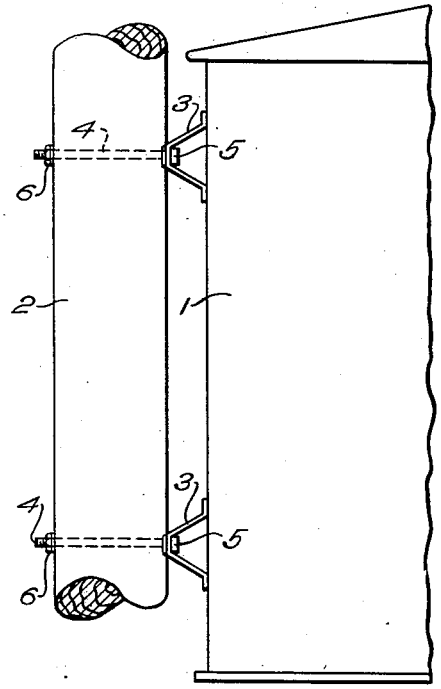
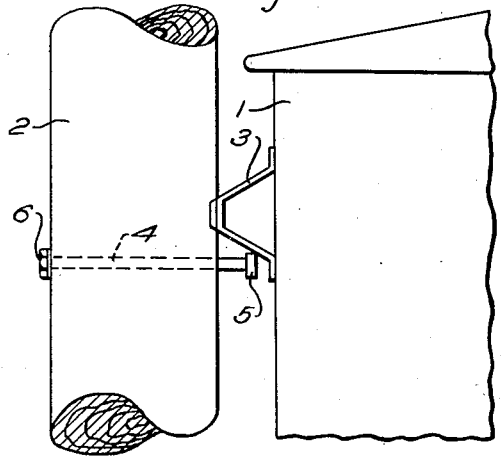
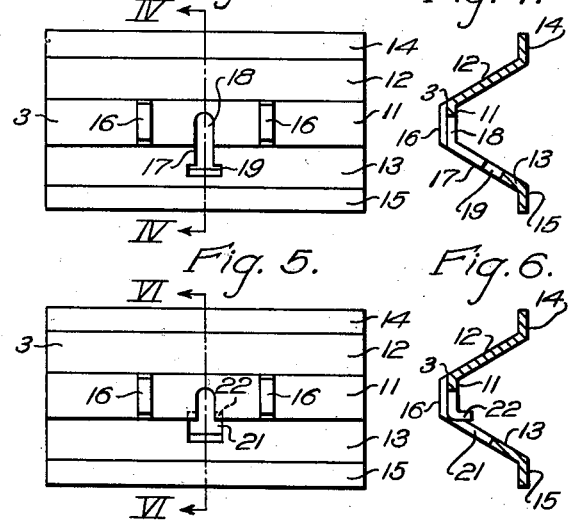
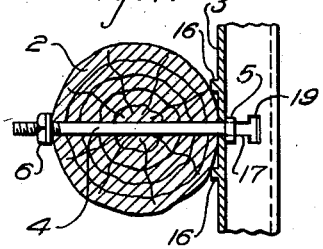
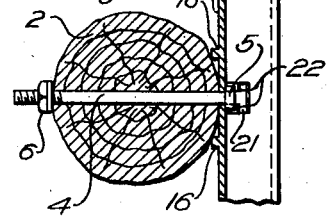
WITNESSES:
Robert C. Baird
Nw. C. Groome
INVENTOR
Delmer W. Callander
BY Franklin E. Hardy
ATTORNEY Patented Nov. 2, 1943

2,333,519

UNITED STATES PATENT OFFICE 2,333,519

TRANSFORMER MOUNTING LUG

Delmer W. Callander, Hamilton, Ontario, Canada, assignor to Westinghouse Electric & Manufacturing Company, East Pittsburgh, Pa., a corporation of Pennsylvania Application February 12, 1942, Serial No. 430,590

6 Claims. (Cl. 248—221)

My invention relates to a supporting device for supporting apparatus such as electrical transformers in elevated positions on poles.

The poles which support transformers are not infrequently struck by moving vehicles which are out of control. Such a blow may cause the entire pole to vibrate or to move suddenly and violently and to such an extent that a transformer supported thereon may break loose and fall to the ground. A severe blow near the bottom of a pole which supports a transformer may not only tend to jar the transformer loose horizontally but may also cause the transformer to jump upwardly. This sudden upward displacement of the transformer may free it from the pole and allow it to drop to the ground.

It is an object of the invention to provide a support or hanger lug that is simple in construction, mechanically strong and that provides a reliable support or hanger for the transformer under normal conditions, and will also support the transformer under abnormal conditions as when the pole upon which the transformer is mounted is subjected to violent shock.

Another object of the invention is to provide a simple transformer support or hanger which will effectively prevent detachment of the transformer from the pole as a result of upward movement of the transformer when the pole is violently jarred.

Other objects and advantages of the invention will be apparent from the following description of preferred embodiments thereof, reference being had to the accompanying drawing, in which:

Figure 1 is a side elevational view of a transformer secured to a pole by a pair of supports or hanger lugs constructed in accordance with the invention, Fig. 2 is an enlarged side elevational view showing the upper hanger lug only positioned about the through-bolt with the head of the through-bolt extending from the pole in a position ready to receive the hanger lug, Fig. 3 is a side elevational view of a hanger lug, or support, constructed in accordance with the invention, Fig. 4 is a sectional view taken on the line IV—IV in Fig. 3, Fig. 5 is a side elevational view of a modified form of hanger lug, Fig. 6 is a sectional view taken on line VI—VI of Fig. 5, Fig. 7 is a horizontal sectional view through the pole and hanger lug at the elevation of a through-bolt showing a support of the character illustrated in Figs. 3 and 4, and Fig. 8 is a horizontal sectional view through the pole and hanger lug of a support corresponding to that shown in Figs. 5 and 6.

In the drawing, a transformer tank 1 is shown mounted on a pole 2 by means of a through-bolt 4 passing through a hole in the pole and provided with a head 5 on the end thereof adjacent the transformer and with a screw threaded nut 6 on the opposite end. The hanger lug or supporting member, may, as shown in Figs. 3 and 4, be constructed with a vertical portion 11 providing a bearing surface for engaging the side of the pole 2 and from the upper and lower edges of which extend sloping portions 12 and 13 which terminate, respectively, in the vertical flanges 14 and 15. The hanger lug may be attached to the tank by welding the flanges 14 and 15 thereto. Vertical ridges or spurs 16 may be provided extending outwardly from the bearing surface to engage the pole on opposite sides of the through-bolt 4 so as to steady the transformer and prevent it from rocking about the point of support established by the bolt. This is best shown in Figs. 3, 4 and 7. A slot 17 is provided in the hanger lug 3, the upper end of which is in the vertical portion 11 and terminates in a rounded end 18 providing a bearing resting on the through-bolt 4 behind the head 5 thereof when in position. The slot 17 is of a width sufficient to accommodate the shank of the bolt 4 and is formed at its lower end with a widened portion 19 of a width sufficient to permit the bolt head 5 to pass through the lower sloping portion 13 of the hanger lug or supporting structure.

When it is desired to mount the transformer on the poles, the through-bolts 4 are inserted through the pole with the head 5 spaced outwardly from the pole as shown in Fig. 2, a distance sufficient that when the supporting hanger lugs 3 are brought against the pole above the bolts, the widened portion 19 of the slot will be just above the bolt head 5. As the transformer is lowered slightly from this position, the head 5 of the bolt 4 passes through the widened portion 19 of the slot 17 and the shank of the bolt passes through the slot 17 until engaged by the bearing surface at the upper end 18 of the slot. The nut 6 is then tightened so as to bring the bolt head 5 tightly against the hanger lug, thus causing the vertical portion 15 of the lug to press tightly against the pole. It will be clear from an examination of the structure of the supporting hanger lug and from reference to Fig. 7, that any upward movement of the transformer caused by a shock to the pole cannot cause the transformer to jump its mountings, since the bolt head 5 is not vertically above the widened portion 19 of the slot 17 which is necessary in order for the bolt head to pass through the lug.

Figs. 5, 6 and 8 illustrate a hanger lug similar in principle to that shown in Figs. 3, 4 and 7, but differ slightly therefrom in that the widened portion 21 of the slot 17, which is provided for permitting the bolt head 5 to pass through the structure, is positioned below the junction of the vertical portion 15 and the lower sloping portion 14. In the form of structure shown in Figs. 5, 6 and 8, the bolt head 5 is prevented from passing through the opening 21 when tightly engaged against the inner surface of the vertical portion 15 by stops 22 extending outwardly from the lug beneath the bolt head. It is thus necessary to loosen the nut 6 and move the bolt head 5 sufficiently away from the pole to permit its passing the stops 22 before it can pass through the widened portion 21 of the slot 17.

It will be apparent from the foregoing description that the hanger lugs constructed in accordance with the invention provide a simple and ready means for attaching a transformer to a pole and for rigidly supporting it and so that it cannot jump its mountings and drop to the ground upon a shock to the pole, such as might tend to cause the transformer to move upwardly with respect to the pole.

Modifications in the structure specifically illustrated and described may be made within the spirit of my invention, and I do not wish to be limited otherwise than by the scope of the appended claims.

I claim as my invention:

1. A transformer hanger including an upper and a lower through-bolt to pass through a pole, an upper and a lower supporting structure each comprising a portion extending upwardly and outwardly from the transformer and having a vertical portion spaced from the transformer to provide a bearing surface for engaging said pole, said supporting structures having slots therein in vertical alignment, each slot having a width sufficient to receive the shank of a through-bolt and providing a bearing surface for said shank at the upper end of the slot and a widened portion at the lower end of the slot for passing the head of the through-bolt through the supporting structure, the widened portion for receiving the head of the through-bolt being in the upwardly and outwardly extending portion of the supporting structure and the upper end of the slot forming the bearing surface being in the vertical portion of the supporting structure.

2. A transformer hanger including a through-bolt to pass through a pole, a supporting hanger lug secured to the transformer and having a portion sloping upwardly and outwardly from the transformer and a vertical portion extending upwardly from the sloping portion in spaced relation to the transformer to provide a bearing surface for engaging said pole, said hanger lug having a slot therein to receive the bolt, the upper part of the slot being in the vertical portion of the lug and being of a width to accommodate the shank of the through-bolt, the lower part of the slot being in the sloping portion and having a width at its lower end sufficient to receive the head of the through-bolt.

3. A transformer hanger including a through-bolt to pass through a pole, a supporting hanger lug secured to the transformer and having a portion sloping upwardly and outwardly from the transformer and a vertical portion extending upwardly from the sloping portion in spaced relation to the transformer to provide a bearing surface for engaging said pole, said hanger lug having a slot therein to receive the bolt, the upper part of the slot being in the vertical portion of the lug and of a width to accommodate the shank of the through-bolt, the lower part of the slot being in the sloping portion and having a width at its lower end sufficient to receive the head of the through-bolt, said hanger lug having spurs extending outwardly from the bearing surface to engage the pole on opposite sides of the through-bolt.

4. A transformer hanger including a through-bolt to pass through a pole, a supporting hanger lug secured to the transformer and having a portion sloping upwardly and outwardly from the transformer and a vertical portion extending upwardly from the sloping portion in spaced relation to the transformer to provide a bearing surface for engaging said pole, said hanger lug having a slot therein to receive the bolt, the upper part of the slot being in the vertical portion of the lug and of a width to accommodate the shank of the through-bolt, the lower part of the slot being in the sloping portion and having a width at its lower end sufficient to receive the head of the through-bolt, the lower widened portion of the slot being sufficiently below the junction between the sloping and vertical portions of the hanger lug to prevent passage of the bolt head therethrough when positioned close to the pole.

5. A transformer hanger including a through-bolt to pass through a pole, a supporting hanger lug secured to the transformer and having a portion sloping upwardly and outwardly from the transformer and a vertical portion extending upwardly from the sloping portion in spaced relation to the transformer to provide a bearing surface for engaging said pole, said hanger lug having a slot therein to receive the bolt, the upper part of the slot being in the vertical portion of the lug and of a width to accommodate the shank of the through-bolt, the lower part of the slot being in the sloping portion and having a width at its lower end sufficient to receive the head of the through-bolt, and stops above the widened portion of the slot and below the bolt head to prevent passage of the bolt head through the hanger when the bolt head is positioned close to the pole.

6. A transformer hanger including an upper and a lower through-bolt to pass through a pole, an upper and a lower supporting structure secured to the transformer, each supporting structure comprising a portion extending outwardly from the transformer and having a slot therein extending outwardly from the transformer to receive the shank of the through-bolt, the slot being widened at the end nearest the transformer to provide for passing the head of the through-bolt through the supporting structure only when the bolt head is spaced substantially from the pole, said opening in the supporting structure being out of alignment with the bolt head when the bolt head is tightened against the supporting structure to prevent passage of the bolt head through the opening when the bolt head is positioned close to the pole.

DELMER W. CALLANDER.